United States Patent [19]
Timm et al.

[11] Patent Number: 5,890,061
[45] Date of Patent: Mar. 30, 1999

[54] VEHICULAR EMERGENCY MESSAGE SYSTEM WITH CALL RESTRICTION DEFEATING

[75] Inventors: Mark James Timm, Northville; Walter Alfred Dorfstatter, Farmington; Garth Stephen, Walled Lake, all of Mich.

[73] Assignee: Ford Motor Company, Dearborn, Mich.

[21] Appl. No.: 605,338

[22] Filed: Feb. 9, 1996

[51] Int. Cl.$^6$ .............................. H04Q 7/20; H04Q 7/32
[52] U.S. Cl. ..................... 455/404; 455/403; 455/521; 455/414
[58] Field of Search .................... 455/404, 565, 455/521, 414, 434, 403, 424, 432; 379/200, 199, 37, 144, 45, 51

[56] References Cited

U.S. PATENT DOCUMENTS

| | | |
|---|---|---|
| 3,765,016 | 10/1973 | Bert et al. . |
| 4,860,336 | 8/1989 | D'Avello et al. .................. 379/144 |
| 4,897,642 | 1/1990 | DiLullo et al. . |
| 4,908,848 | 3/1990 | Hanawa ................................. 455/565 |
| 4,945,556 | 7/1990 | Namekawa .............................. 455/565 |
| 5,043,736 | 8/1991 | Darnell et al. . |
| 5,081,667 | 1/1992 | Drori et al. . |
| 5,119,504 | 6/1992 | Durboraw, III . |
| 5,159,625 | 10/1992 | Zicker ..................................... 455/565 |
| 5,223,844 | 6/1993 | Mansell et al. .......................... 455/404 |
| 5,339,351 | 8/1994 | Hoskinson ................................ 379/37 |
| 5,388,147 | 2/1995 | Grimes ..................................... 379/37 |
| 5,463,675 | 10/1995 | Gerszberg ................................ 455/434 |
| 5,465,388 | 11/1995 | Zicker ...................................... 455/404 |
| 5,487,108 | 1/1996 | Atkins et al. ............................. 455/565 |
| 5,542,100 | 7/1996 | Hatakeyama ............................ 455/404 |
| 5,579,443 | 11/1996 | Tatematsu et al. ...................... 455/521 |
| 5,602,901 | 2/1997 | Redden et al. ............................ 379/37 |

FOREIGN PATENT DOCUMENTS

| | | |
|---|---|---|
| 0123562 | 10/1984 | European Pat. Off. . |
| 0242099 | 10/1987 | European Pat. Off. . |
| 2541801 | 2/1983 | France . |
| WO 89/12835 | 12/1989 | WIPO . |

OTHER PUBLICATIONS

Cellular Positioning and Emergency Messaging Unit Publication, Motorola, 1994.

*Primary Examiner*—Wellington Chin
*Assistant Examiner*—Keith Ferguson
*Attorney, Agent, or Firm*—Mark Mollon

[57] ABSTRACT

A vehicle user can request emergency or roadside assistance from a response center by activating a button in the vehicle. The global positioning system is used to continuously store the vehicle location. A cellular telephone network is used to contact a response center and transfer a data string via modem containing information to assist the response center in acting on the request. Prior to attempting dialing of the cellular transceiver, a command or set of commands places the cellular transceiver into an unrestricted operating mode to provide the greatest probability of completing a call from the vehicle to the response center and from the response center to the vehicle.

7 Claims, 6 Drawing Sheets

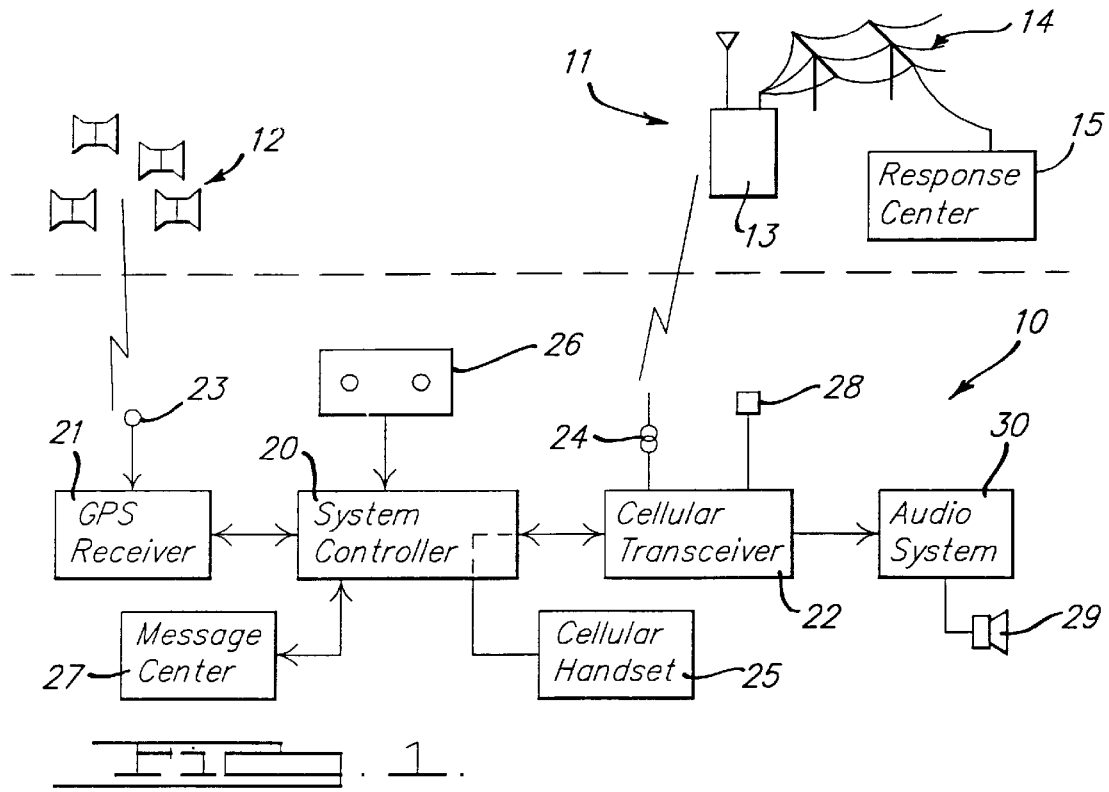
FIG. 1.
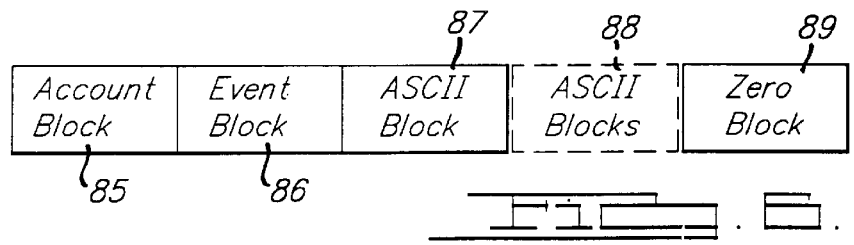
FIG. 6.
| | RCE | AR | BLen | Func Code | Data (CID) | CPar |
|---|---|---|---|---|---|---|
| Bin | 0 | 1 | 001010 | 00100011 | | * |
| Hex | | 4A | | 23 | 31 32 38 37 36 35 34 33 32 31 | * |
| ASCII | | J | | # | 1 2 8 7 6 5 4 3 2 1 | * |
FIG. 7.
| RCE | AR | BLen | Func Code | Data (Day, Time Of Day, Event Code) | CPar |
|---|---|---|---|---|---|
| 0 | 0 | 010110 | 01001110 | | * |
| | 16 | | 4E | | * |
| | | | N | da06-01-95ti14:23:34QS | * |
FIG. 8.

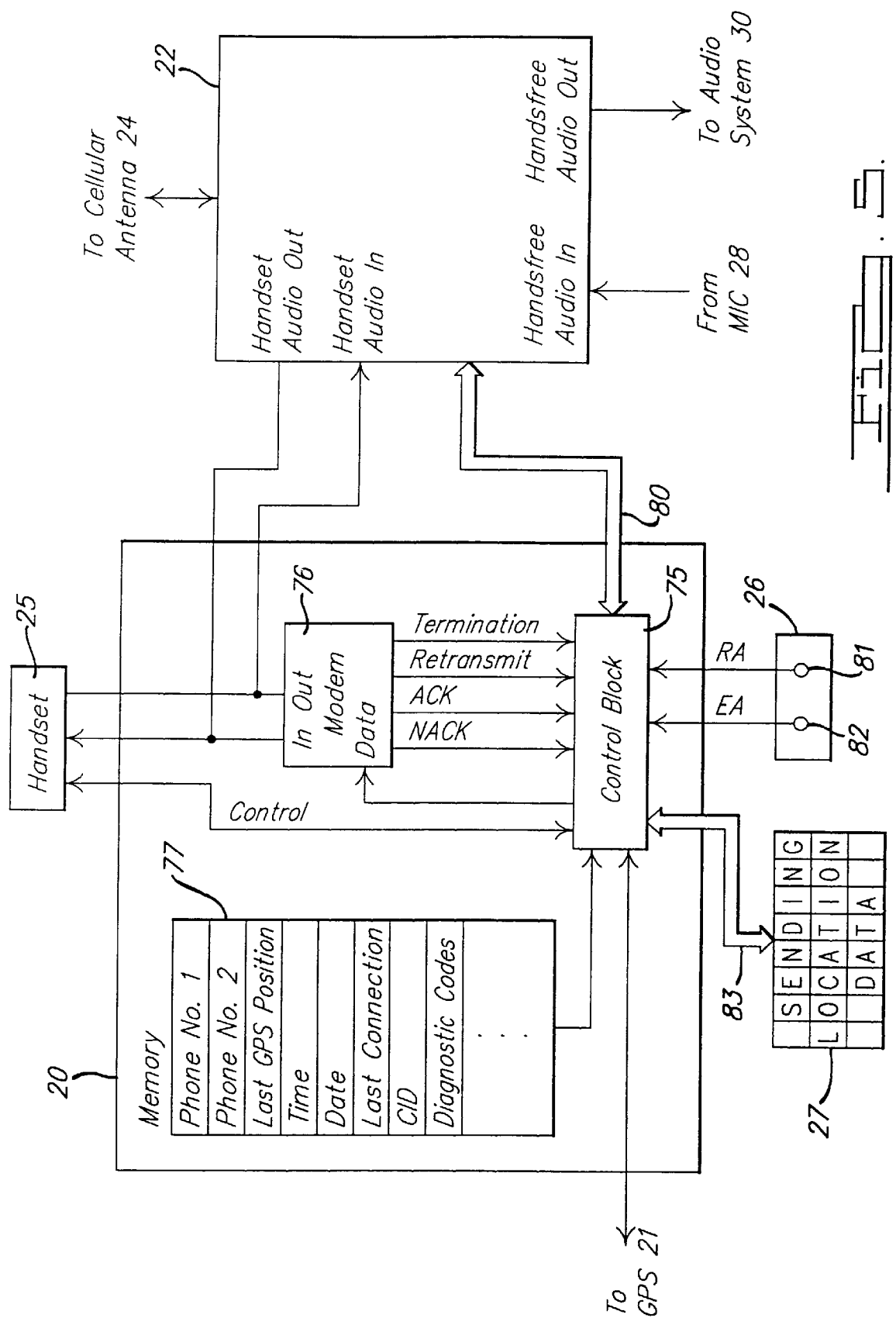

VEHICULAR EMERGENCY MESSAGE SYSTEM WITH CALL RESTRICTION DEFEATING

BACKGROUND OF THE INVENTION

The present invention relates in general to a communication system that provides an automated and simplified interface between a vehicle and an emergency response center using cellular telephone communications, and more specifically to selecting cellular phone operating modes that maximize the ability to successfully complete a call from the vehicle to the response center or from the response center to the vehicle.

The use of transportation vehicles such as automobiles on roads and highways inevitably involves some number of breakdowns or collisions, or situations involving health difficulties of a driver or a passenger in which roadside vehicle service, such as a tow truck, or emergency assistance, such as police, ambulance, or fire, are needed. A means of summoning help is desirable in such situations and the availability of radio communications has been very beneficial in that regard. Cellular telephones are often installed or carried in vehicles by their owners for this reason.

The response time to a request for help should be minimized to meet any potential need for critical services. Accurate information must be provided to the emergency service provider to permit effective and timely response. However, many cellular phone callers to emergency services are unable to provide their location accurately in a timely manner. In addition to position information, a service provider benefits from having information on vehicle identification, cellular phone number of the telephone in the vehicle, the cellular system identification from which a call originated, and speed and heading of a vehicle.

Automatic position locating systems such as a global positioning system (GPS) receiver have been utilized in conjunction with a cellular telephone unit to provide position information over a cellular link. Copending U.S. applications Ser. No. 08/419,349 and Ser. No. 08/419,350, each entitled "Vehicular Emergency Message System", describe a communication system which has high reliability and ease of use based on an automated interface between the vehicle and the response center.

An individual cellular telephone installed in a vehicle may be set-up by the owner in such a way that only some specific cellular communications are permitted while other possible communications are inhibited. These restricted operating modes can arise from a desire to avoid using certain cellular service providers (i.e., carriers) or geographic areas or from a desire to restrict the numbers which can be called from the individual phone as determined by the owner. However, these restricted operating modes or service levels of the cellular telephone can interfere with the ability of an emergency message system to contact a response center or with the ability of the response center to place a return call to the cellular telephone.

SUMMARY OF THE INVENTION

The present invention provides an emergency cellular communication system having the advantage that any restricted operating modes of an individual cellular telephone are defeated prior to initiating a request for assistance, thereby allowing more reliable connection over a cellular telephone network.

Specifically, the present invention provides a vehicular emergency message system in a mobile vehicle for communicating with a response center. A cellular transceiver, such as a cellular telephone, has a control input. The cellular transceiver selected either a restricted operating mode or an unrestricted operating mode in response to predetermined commands received via the control input. The restricted operating mode is selectable by a user to affect the communication links that are permitted during normal operation of the cellular transceiver. A controller is coupled to the cellular transceiver for controlling the cellular transceiver to communicate with the response center in a predetermined manner. An activation unit is coupled to the controller and is responsive to a manual activation to send an activating signal to the controller to cause the controller to initiate communication with the response center. Prior to dialing of the cellular transceiver, the controller produces a predetermined command to select the unrestricted operating mode.

BRIEF DESCRIPTION OF THE DRAWINGS

FIG. 1 is a block diagram showing vehicle hardware and infrastructure elements of a vehicle emergency message system.

FIG. 5 is a schematic block diagram showing the controller of FIG. 1 in greater detail.

FIG. 6 illustrates a data string utilized in the present invention.

FIG. 7 is a table showing construction of the account block of FIG. 6.

FIG. 8 is a table showing construction of the event block of FIG. 6.

DETAILED DESCRIPTION OF PREFERRED EMBODIMENTS

Basic System Operation

Figure 2:
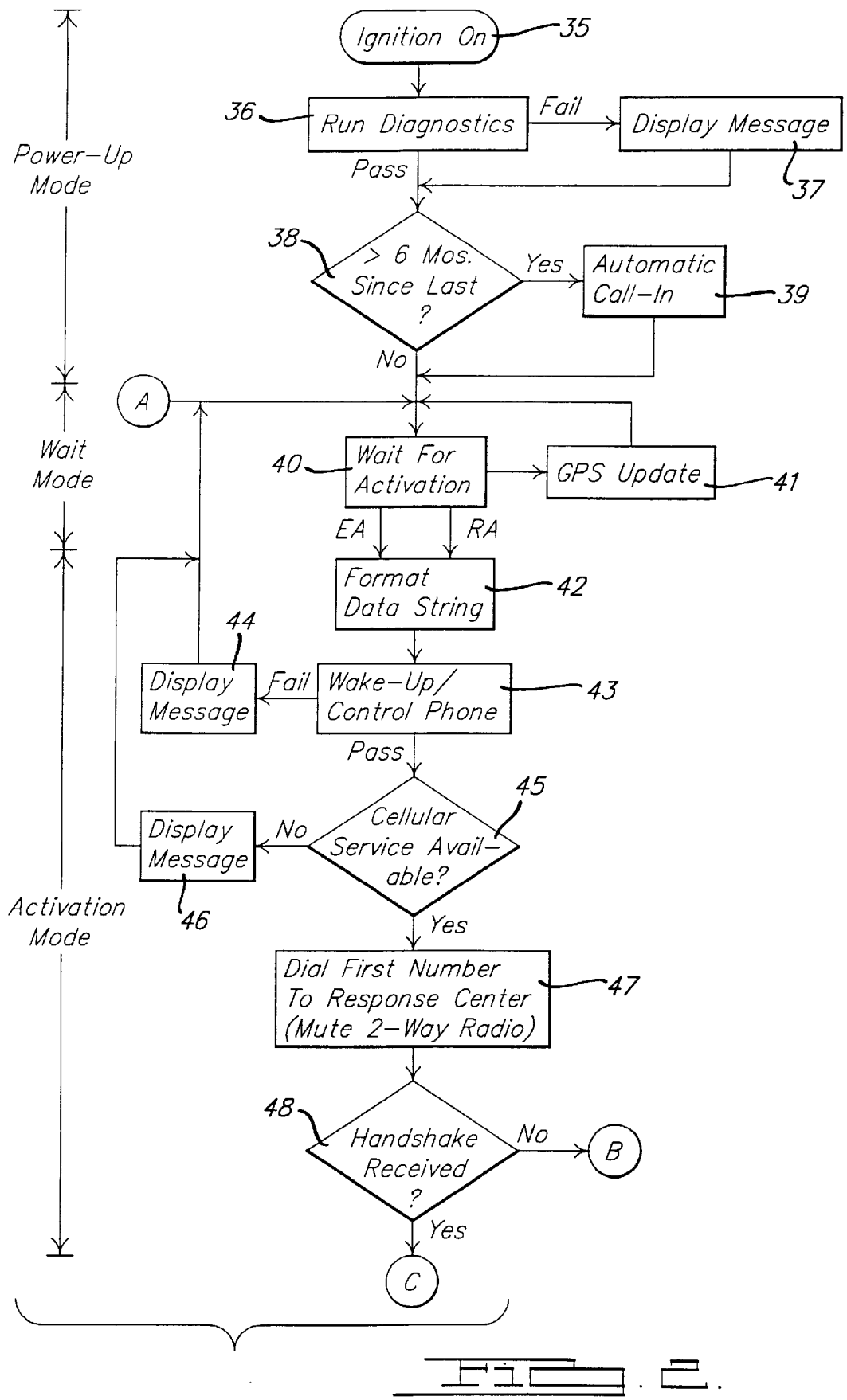
FIGS. 2–4 show a flowchart describing operation of a vehicle apparatus in the present invention.

Referring to FIG. 1, a vehicle emergency message system includes vehicle hardware 10 and system infrastructure 11. Infrastructure 11 includes GPS satellites 12 in earth orbit and a network of cellular towers 13 connected to a land-line phone system 14. A response center 15 is connected to telephone system 14 and provides a 24 hour monitoring service responsive to messages and requests for assistance from registered users.

Vehicle hardware 10 includes a system controller 20 connected to a GPS receiver 21 and a cellular transceiver 22. GPS receiver 21 is connected to a GPS antenna 23 typically in the form of a radome, while cellular transceiver 22 is connected to a cellular antenna 24. A cellular handset 25 is connected to cellular receiver 22 through system controller 20, thereby allowing system controller 20 to control cellular transceiver 22 and access the audio signal transmissions of transceiver 22.

System controller 20 interacts with a user (i.e., the driver or a passenger of the vehicle) through a switch assembly 26 and a display message center 27. Switch assembly 26 preferably includes two push buttons for activating the vehicle emergency message system according to the type of assistance that is needed, thereby allowing the response center to prioritize incoming requests. Preferably, the two push buttons identify either a request for roadside assistance (i.e., vehicle mechanical trouble) or emergency assistance (i.e., a medical condition or a crime in progress). Switch assembly 26 may preferably be mounted to an overhead console in a vehicle, for example. Display message center 27 is preferably mounted to an instrument panel of the vehicle and provides an alphanumeric display (e.g., an LED matrix or a vacuum fluorescent display) to show system status and to display system information as will be described below.

Transceiver 22 operates in either a handset or a hands-free mode. A hands-free microphone 28 is mounted in the vehicle and connected to transceiver 22. A hands-free speaker 29 can be connected directly to transceiver 22 or may be connected through the vehicle audio system 30 (i.e., the amplifier and speakers of the vehicle audio/radio system can be employed as the hands-free speaker for the cellular phone).

Operation of vehicle hardware 10 will be described with reference to the flowchart of FIGS. 2–4. In general, hardware operation is characterized herein by four operating modes; a power-up mode, a wait mode, an activation mode, and a communication mode. The power-up mode includes the performance of system diagnostics to determine if component failures exist. The wait mode includes the updating of vehicle position information while waiting for a manual activation by the user. The activation mode includes the assembly of data for transmission to the response center, dialing of the cellular phone to establish communication with the response center, and detection of a successful connection. In the communication mode, digital data may be sent to the response center and voice contact between the user and the response center is established.

Figure 3:
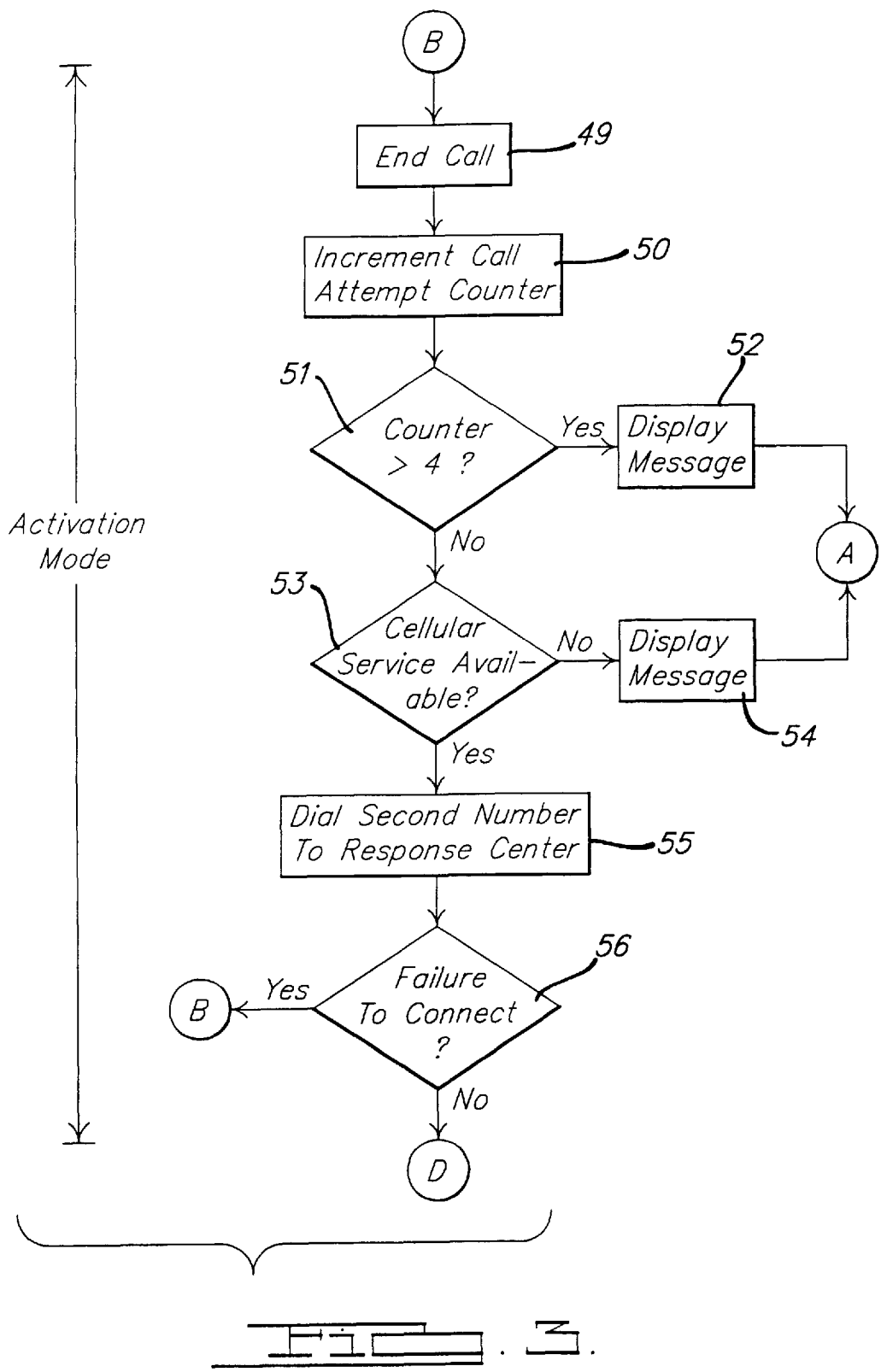

Referring to FIG. 2, the power-up mode begins when the vehicle ignition switch is turned on in step 35. A self-diagnostic check of the vehicle emergency message system (VEMS) components is run in step 36 and preferably includes GPS diagnostics, cellular phone diagnostics, and activation switch diagnostics. If any fault condition is detected that prevents proper operation of the system, then a message such as "SYSTEM FAILURE" is displayed in the message center in step 37. An indicator light may be provided, e.g., mounted on switch assembly 26, that is illuminated during power-up diagnostics at the beginning of step 36 and is extinguished in the event that all diagnostic tests are passed at the end of step 36. Step 37 bypasses the turning off of the indicator light so that it remains lit as a reminder that a fault has been detected.

Following the diagnostic tests, an automatic call-in procedure may be optionally utilized during the power-up mode. In step 38, a check is made whether a predetermined duration of time (e.g., preferably at least six months) have passed since the last time that VEMS 10 was connected to the response center. If at least six months have passed, then an automatic call-in is performed in step 39. The automatic call-in to the response center helps assure that the system is functioning properly and that a user's cellular account is active. If the response center has not received an automatic call-in from a particular vehicle within a predetermined time after the six month period, then the response center can send a reminder to the vehicle owner to have their system checked.

After the power-up mode, system 10 enters the wait mode and waits for a manual activation of the switch assembly in step 40. While in the wait mode, system 10 obtains periodic position updates from the GPS receiver in step 41. Position may be updated at one second intervals, for example. In addition to position, each update includes an updated time (i.e., time-of-day and date) and vehicle direction and speed (as determined by Doppler effects on the received GPS satellite signals provided the vehicle is moving at at least about 15 MPH). The most recently obtained valid position in longitude and latitude, together with the time it was collected and the last obtained vehicle heading and speed information, are stored in a memory in system 10. Thus, system 10 is able to provide the response center with the most recently collected valid position of the vehicle and the direction it is or was most recently heading. The GPS receiver may be momentarily unable to determine position in the event that obstructions are preventing reception of GPS signals at the time the call for assistance is made. If system 10 is unable to collect GPS readings for greater than a predetermined period of time, it may be desirable to indicate a failure to the user via the message center or an indicator light, and to store an indication of the failure in memory as a diagnostic code.

In step 40, the controller polls the manual activation buttons in the switch assembly to detect a manual activation. The switch assembly preferably provides a roadside assistance (RA) button labeled with a tow-truck and an emergency assistance (EA) button labeled with an ambulance, for example. When the user presses either button, an RA signal or an EA signal is generated which places system 10 in the activation mode and causes a message, such as "ROADSIDE REQUEST" or "EMERGENCY REQUEST", to be displayed.

In step 42 of the activation mode, the controller formats a data string to be transmitted to the response center using a modem signal via the cellular transceiver. The data string includes customer identification, position, and other information as will be described below. In step 43, the controller wakes-up (i.e., activates, if necessary) and establishes control of the cellular transceiver. If the controller is not successful in obtaining control of the cellular phone, then a message is displayed, such as "SYSTEM FAILURE", and the attempt to make a call is aborted with a return to point A. If the cellular phone is active and in use, step 43 may include terminating an existing call so that the response center can be contacted. In step 45, the VEMS controller verifies whether cellular service is available in the area where the vehicle is located (i.e., whether the cellular transceiver can establish communication with a cellular tower). If cellular service is not available after attempting to establish a connection for a certain time (e.g., up to two minutes), then a message such as "NO CELLULAR SIGNAL" is displayed in step 46 and a return is made to the wait mode via point A.

In the event that cellular service is available, the controller causes the cellular transceiver to dial a first number to the response center while the hands-free audio of the phone is muted in step 47. Two separate numbers to the response center are preferably utilized wherein the first number connects to an automated data receiver for receiving digitally transmitted information via modem prior to connecting the user with a human operator. A second number bypassing the automated data reception and connecting directly to the human operator is used in some circumstances as will be described below. In the first call, however, the automated transmission of data is attempted and the audio outputs of the phone are muted in the vehicle so that modem signals are not heard by the user. Preferably, the system controller maintains full, uninterruptible control over the cellular transceiver during this first call to ensure a reliable connection with the response center in the majority of instances.

Upon connection with the automated data receiver at the response center, a handshake signal is sent from the response center using a tone at a predetermined frequency. System 10 attempts to detect a handshake tone and if one is received in step 48 then a jump is made to the communications mode at point C (as will be described below with reference to FIG. 4). If a handshake signal is not received in step 48, then the activation mode continues at point B in FIG. 3.

After point B, a command to end any pending call is sent to the cellular transceiver in step 49. In response to the failure to receive a handshake signal, a call attempt counter is incremented in step 50 (this counter should equal 1 after a failure during the first call).

In step 51, the failure counter is checked to determine whether greater than a predetermined number of attempted calls have occurred, e.g., 4. If yes, then a message is displayed in step 52 such as "UNABLE TO PLACE CALL" and a return is made to the wait mode at point A. If less than the maximum number of attempted calls have occurred, then a recheck for availability of cellular service is performed in step 53. If cellular service is not obtained within two minutes, then a message is displayed in step 54 such as "NO CELLULAR SIGNAL" and a return is made to the wait mode at point A. Otherwise, the controller causes the cellular receiver to dial a second number to the response center in step 55. In the call to the second number, which is a voice number that bypasses the data receiver at the response center, the cellular phone is placed in hands-free mode and is unmuted to allow conversation between the user and the operator at the response center. Unlike during the first call, the user has full control over the cellular phone via the handset during the second call to provide maximum flexibility in unusual circumstances.

In an alternative embodiment, only one attempted call is made to the second number. In that case, it is not necessary to maintain a call attempt counter. A return to the wait mode is made if the second call fails to reach the response center on its first try.

An important reason to conduct the second call to a second number and having the hands-free phone audio unmuted during the second call, is that if the user is outside his home cellular phone area (i.e., is "roaming") an operator for the cellular system to which the user connects may come on-line to request credit card or other information before completing a cellular call. By unmuting the phone, not automatically transmitting the data during a second call, and relinquishing control of the cellular phone to the user, the user can interact with the cellular operator to obtain a phone connection to the response center. The response center can still then obtain the digital data using a retransmit tone as described below.

If the cellular phone detects a failure to establish a cellular connection after dialing the second number, then the failure is detected by the controller in step 56 and a return is made via point B to step 50 for a possible redial to the second number. If dialing the second number is successful as detected in step 56, then the system is placed in the communication mode via point D.

Figure 4:
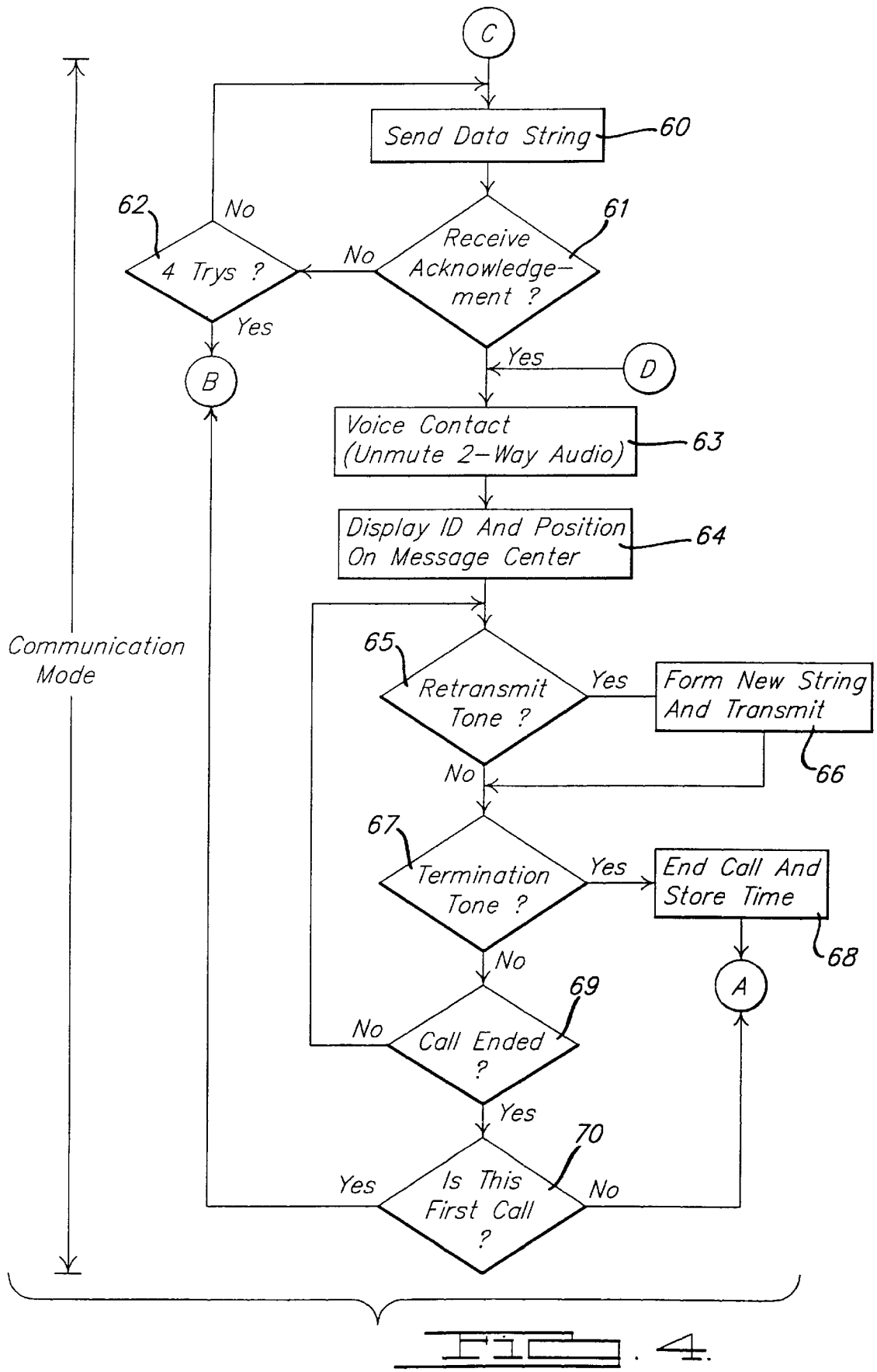

Operation of system 10 in the communication mode is shown in FIG. 4. After successful connection to the first phone number at point C, the data string that was previously formatted is sent to the response center via modem in step 60. Upon successful reception of the data at the response center, the response center produces an acknowledgment tone at a predetermined frequency. System 10 checks for receipt of the acknowledgment tone in step 61. If no acknowledgment tone is received, then a check is performed in step 62 to determine whether to try to resend the data string. For example, a maximum of four attempts to send the data string may be performed. If less than the maximum number of tries have been attempted, then a return is made to step 60, otherwise a return is made to the activation mode at point B for attempting to connect to the second phone number without data transmission. If an acknowledgment tone is received to the data string, then the cellular phone is unmuted in step 63 to provide two-way audio, and voice contact is made with the response center after the call is transferred to a live operator. In addition, at least some of the information from the data string is displayed on the message center in step 64. During the first call, this information may be used to confirm the data already sent to the response center.

If the communication mode is entered at point D following a call to the second (non-data) phone number, then the information from the data string displayed on the message center in step 64 preferably includes an identification of the user (e.g., a customer ID) and the last obtained position from the GPS receiver displayed in latitude and longitude. As this information is displayed in step 64, the response center can obtain the displayed information by having the user read it over the cellular communication channel.

During voice contact with the response center, the system controller in the vehicle monitors the communication channel for tone signals transmitted by the response center. In step 65, the communication channel is monitored for a retransmit tone indicating a request by the response center for the vehicle to resend the data string. A new, updated data string is formed and then transmitted in step 66. Thus, the response center may obtain the data in the data string even though the first data call may have been unsuccessful. Also, the response center can obtain updates to the information as a call is in progress, such as where the vehicle continues to move during the emergency.

The controller likewise monitors the communication channel for a termination tone in step 67. The response center will send a termination tone when a successful resolution has been reached in the call for assistance (e.g., assistance has been dispatched to the scene). Upon detection of the termination tone, the controller sends an end-call command to the cellular phone and stores the time of the current activation in memory in step 68. Then a return to the wait mode is made at point A.

In step 69, if the cellular transceiver detects that a call has ended, either intentionally or because of loss of the cellular carrier signal, it sends a signal to the controller indicating an end of call, otherwise the communication channel continues to be monitored for retransmit or other tones.

In response to premature ending of the call in step 69, the controller may preferably return to point B in the activation mode for a possible attempt to reconnect the user with the response center. In an alternative embodiment as shown in FIG. 4, an attempt to automatically reconnect is made only if it was the first call that ended prematurely. Thus, step 70 checks whether the call was the first call. If it was the first call, then a return is made to point B for a second call. If it was not the first call, then a return is made to the wait mode at point A.

FIG. 5 shows system controller 20 in greater detail. A control block 75 such as a microprocessor is connected to a modem 76 and a memory 77. Control block 75 is connected to GPS receiver 21, handset 25, and switch assembly 26. Control block 75 is further connected to cellular transceiver 22 via a control bus 80. Control signals that are exchanged between control block 75 and cellular transceiver 22 via bus 80 include a mute control signal, a phone in-use signal, and control signals to place the cellular transceiver into a desired configuration and to command certain actions such as dialing of supplied phone numbers. Furthermore, control signals from handset 25 may be passed through control block 75 to transceiver 22 during normal phone operation.

A handset audio input of transceiver 22 is connected to an output of modem 76 and to an output of handset 25 allowing a modem audio output to be input to the cellular transceiver. The handset microphone may be inactivated during modem output using the control line between control block 75 and handset 25. The handset audio output of transceiver 22 is connected to an input of modem 76 and to an input of handset 25. Modem 76 includes tone detector circuits comprising narrow bandpass filters and level detectors responsive to the predetermined tones that may be transmitted by the response center. For example, a termination tone of 2,025 Hz and a retransmit tone of 2,225 Hz and each having a duration of about 1 to 1.4 seconds are employed in a preferred embodiment. Of course, any frequency within the audio range of the cellular transceiver can be employed. Upon detection of a particular tone, a signal is provided to control block 75 such as a retransmit signal, an acknowledgment (ACK) signal, a negative acknowledgment (NACK) signal, or a termination signal.

Memory 77 stores data such as the first and second phone numbers to the response center, the last GPS position longitude and latitude, time-of-day and date of GPS position, time-of-day and date of last connection with the response center, a customer identification code, any diagnostic codes detected during system diagnostics, and other information. Control block 75 utilizes data from memory 77 in formatting a data string for transmission. In addition, information such as the cellular telephone number of the cellular phone and any identification of the cellular carrier to which the cellular phone is currently connected are obtained from transceiver 22 for inclusion in the data string.

Switch assembly 26 includes a roadside assistance push button 81 and an emergency assistance push button 82 for providing signals RA and EA, respectively, to control block 75.

Message center 27 is connected to control block 75 over a bus 83. Message center 27 is shown as a matrix display capable of displaying alphanumeric characters in a 3×8 matrix.

Data communications between controller 20 and the response center will be described in greater detail with reference to FIGS. 6–8. Data communications are preferably in conformance with Section 3 of the *Digital Communications Standard* by SIA, February, 1993.

FIG. 6 illustrates the contents of the data string assembled for transmission. The data string includes an account block 85, an event block 86, one or more ASCII blocks 87 and 88, and a zero block 89. Each block is transmitted separately by the modem.

Account block 85 is the first block to be sent and is used to pass the customer identification number (CID) stored in memory that may be assigned based on the identity of the vehicle. Thus, the response center automatically retrieves information on the identity of the vehicle and the owner involved in the request. The account number may preferably have an assigned unique identifier code based on the vehicle identification (VIN) number given to a vehicle at the time of manufacture. Some subset of the full VIN number may be used if the CID has less characters than the VIN.

Event block 86 is the second block to be sent and is used to pass information concerning the type of request (i.e., either roadside assistance or emergency assistance) and time-of-day and date information.

ASCII blocks 87 and 88 are transmitted after event block 86 and include additional information such as latitude and longitude position, vehicle heading, vehicle speed, dilution of precision (DOP), cellular phone number, cellular system identification, and any diagnostic codes logged into the memory.

The last block to be transmitted is the zero block which marks the end of the data and which requests acknowledgment from the response center to receipt of the data.

Each block is constructed with a header byte, a function byte, data bytes, and a column parity byte. FIG. 7 shows an example of the construction of an account block. The header byte includes a reverse channel enable (RCE) bit, and acknowledge request (AR) bit, and block length (BLen) bits. As defined in the SIA document referred to above, the RCE bit serves to identify the beginning of a block. The AR bit tells the receiver at the response center whether to acknowledge receipt of a particular block. In a preferred embodiment of the present invention, only the account block and the zero block request acknowledgment. The value of the BLen bits specifies the number of data bytes being transmitted in the block. As shown in FIG. 7, the binary value of RCE is always zero. The binary value of AR is one since the account block requests acknowledgment. The binary value of BLen of "1010" corresponds to the length of the CID data field equal to 10 in decimal. The hexadecimal and ASCII values of the block are also shown in FIG. 7, with the exception of column parity (CPar) values which are not shown but are within the skill of the art to derive. A function code of "#" in ASCII is shown identifying that the block is the account block.

FIG. 8 shows an example of a construction of an event block. The function code for the event block identifies the position information in a request as new ("N") GPS data or old ("O") GPS data. The data in the event block specifies the date and time-of-day of the last valid GPS position and also identifies the type of event causing the data to be transmitted. Thus, an event code is specified for an emergency assistance request, a roadside assistance request, a follow-up or retransmission of data in response to a retransmit tone, and an automatic (6 month) call-in. In a preferred embodiment, an event code "QA" identifies emergency assistance, "QS" identifies roadside assistance, "YY" identifies a follow-up transmission, and "RP" identifies an automatic call-in.

As shown in FIG. 8, data fields in the blocks may include alphanumeric characters to identify data within a block, such as "da" prior to the date and "ti" prior to the time-of-day in the data field of FIG. 8. These identifiers are provided in the event that the operator at the response center needs to view the transmitted data directly because of an equipment failure at the response center.

The ASCII blocks contain the remaining information to be transmitted as described above (e.g., latitude, longitude, heading, speed, DOP, cellular phone number, and cellular system ID). In addition, the ASCII blocks may transmit information on the revision or version of the vehicle hardware and software installed in the vehicle or diagnostic failure codes.

Restricted Operating Modes

Due to the regulatory structure of cellular radiotelephone service and due to charges that result from various types of use of the service, cellular transceivers are typically designed to permit the owner/user of the transceivers to limit how an individual phone will function.

The U.S. Federal Communications Commission (FCC), for example, has defined a number of cellular markets which are standard geographic areas used in the licensing and authorization of cellular systems. Within each geographic area, the FCC will authorize two competing cellular service providers. An A-channel block and a B-channel block have been specified for exclusive use for each respective service provider within a geographic area. Thus, when a cellular user subscribes with a service provider, the user's cellular transceiver must be set to use the corresponding channel block of that service provider.

The cellular transceiver may contain a programmable memory location specifying one channel block for exclusive use, for example. When a user initiates or receives a call while located in their home area, it will thus be through the service provider holding their subscription. When a user is roaming, any activity will normally be through the carrier using the same channel block as the one used in the user's home area. Cooperative agreements are more likely to be in place between cellular service providers using the same channel block in different areas, thus permitting uninterrupted service when roaming.

Another known restricted mode referred to as "home only" prohibits the completion of calls while roaming. FCC rules define a roamer as a mobile station receiving service from a system other than the one to which it is a subscriber. Each cellular system typically accepts calls from roamers, but the owner of the phone is liable for roaming charges. If a roaming agreement is not in place between the user's subscription provider and the roaming provider, then completion of a call is typically interrupted by an operator who requests credit card information for payment. Each cellular system is required to transmit a system identification number, which allows the mobile transceiver to determine whether it is roaming. The owner of the transceiver can avoid roaming charges by prohibiting calls during roaming.

Still another restricted mode setting causes a transceiver to use one channel block while in the home area but to prefer (i.e., scan first) the other channel block when outside the home area.

A-channel block and B-channel block service providers are not both present in all geographic areas. Furthermore, the geographic areas covered by the competing providers in a single cellular market may not be completely identical, so that there may be areas where only one is usable. Therefore, the restriction of operation to only one channel block may result in the inability to complete a call at a time when the call could be completed by switching to the other channel block. Thus, the use of "home only", "A channel only", "B channel only", or "A or B only at home, scan other channel when roaming" modes are undesirable when making an emergency call.

Because of the cost associated with use of a cellular telephone, many transceivers allow the owner to restrict access, via a security code, to certain dialing functions when other people may be in possession of the transceiver. Restricted modes may include 1) allowing only telephone numbers stored in a speed dial memory to be dialed, 2) allowing only a subset of the telephone numbers stored in a speed dial memory to be dialed, 3) allowing dialing only from the phone keypad, or 4) allowing only seven digit (i.e., no long distance) dialing, for example.

Any of the foregoing restricted modes would be set up in advance by the owner as desired. Activation of any restricted mode, however, creates a previously unsolved problem in that it presents the potential to limit the ability of a vehicle emergency message system to contact a response center or the ability of the response center to place a follow-up call to the vehicle. The present invention avoids any problems that would otherwise be caused by restricted modes by reprogramming the transceiver to operate in an unrestricted mode.

Figure 9:
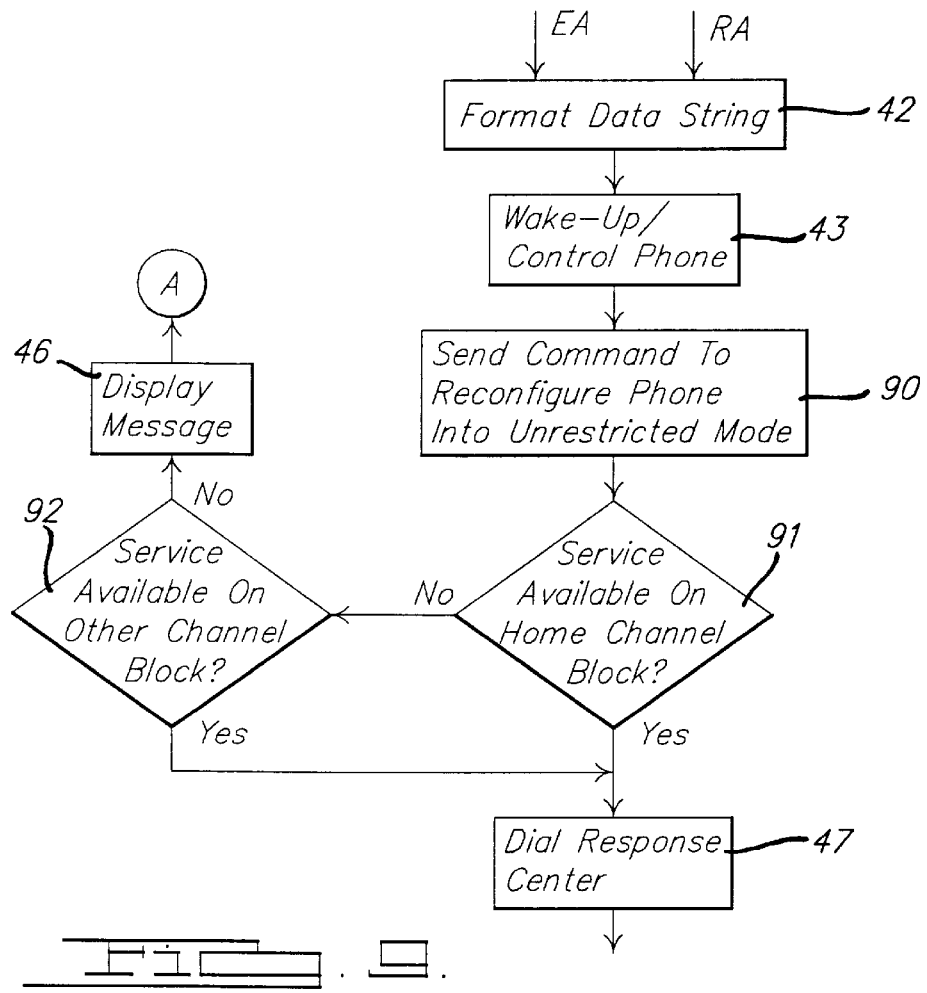
FIG. 9 is a flowchart showing a preferred embodiment of the invention for defeating call restrictions.

The flowchart of FIG. 9 shows a modification of the activation mode of FIG. 2. After an activation, a data string is formatted in step 42 and a command is sent to wake-up and control the phone in step 43. Once control of the phone is obtained by the emergency system controller, a command (or set of commands) is sent to the phone controller to reconfigure the phone to an unrestricted operating mode in step 90. Thus, in the preferred embodiment, any electronic settings within the cellular transceiver that limit use to only one channel block, limit roaming, or limit telephone numbers that may be dialed are reset to unrestricted settings. The set of commands may include 1) altering channel block control to select the home provider's channel block first and to scan the opposite channel block if service on the preferred one is not detected; and 2) removing all dialing restrictions.

A check is made is step 91 to determine whether cellular service is available. Preferably, this first check for cellular service is conducted on the channel block normally used by the transceiver. If cellular service is detected, then the emergency system controller causes the cellular transceiver to dial the response center in step 47. If cellular service is not detected, then the cellular transceiver automatically switches to the opposite channel block and a check is made for cellular service in step 92. If cellular service is detected, then the transceiver dials the response center in step 47; otherwise a message such as "NO CELLULAR SIGNAL" is displayed in step 46 and a return is made to the wait mode.

Figure 10:
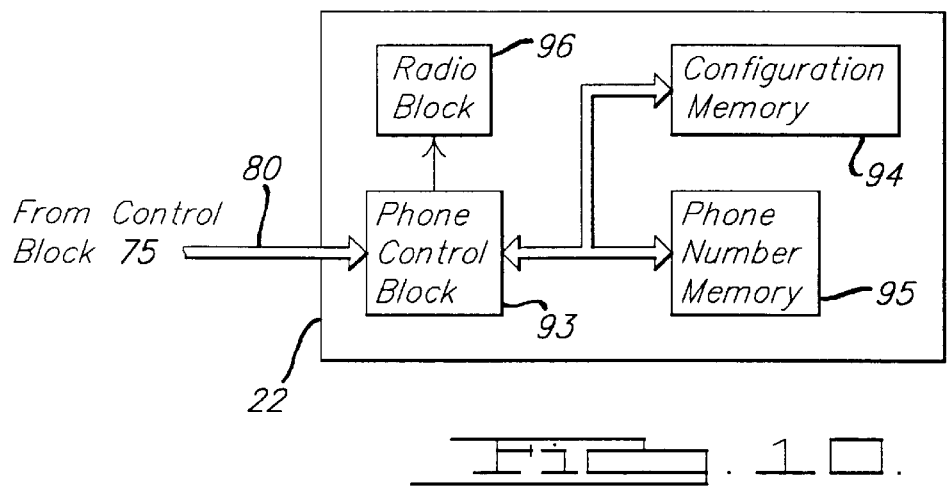
FIG. 10 is a block diagram of a cellular transceiver with restricted and unrestricted dialing modes.

The block diagram of FIG. 10 shows portions of cellular transceiver 22 that are controlled by system control block 75 (FIG. 5) via control bus 80. Specifically, a phone control block 93 receives commands via control bus 80 to reset a configuration memory 94 so that configuration memory 94 contains values corresponding to an unrestricted operating mode. Phone control block 93 is connected to a phone number or speed dial memory 95 that is manually programmed with phone numbers by the user. The configuration memory may contain settings that permit dialing only to numbers stored in memory 95 or only to a subset of numbers stored in memory 95.

Phone control block 93 is coupled to a radio block 96 that performs all broadcast and reception functions. Phone control block 93 commands radio block 96 to use one or the other of the A-channel block or the B-channel block.

Following an activation and a call to the response center, no attempt is made to restore the previous restricted mode, if any. In some circumstances, it may be desirable for the response center to place a follow-up call to the vehicle (to confirm arrival of assistance, for example). In order to maximize the ability that the cellular transceiver in the vehicle will be reachable from the response center, operation on both channel blocks is maintained. In addition, dialing restrictions are not restored so that maximum flexibility is obtained in reacting to the emergency situation.

What is claimed is:

1. A vehicular emergency message system in a mobile vehicle for communicating with a response center, comprising:

a cellular transceiver having a control input, said cellular transceiver selecting a restricted operating mode or an unrestricted operating mode in response to predetermined commands received via said control input, said restricted operating mode being selectable by a user to affect communication links that are permitted during normal operation of said cellular transceiver;

position determining means for determining a location of said mobile vehicle;

an emergency message controller coupled to said cellular transceiver for controlling said cellular transceiver to communicate with said response center in a predetermined manners including transmission of said location to said response center; and an emergency message activation unit coupled to said controller responsive to a manual activation to send an activating signal to said controller to cause said controller to initiate communication with said response center;

wherein, prior to initiating dialing of said cellular transceiver, said controller produces said predetermined command to select said unrestricted operating mode.

2. The system of claim 1 wherein said restricted operating mode permits dialing to only one of an A-channel block service provider or a B-channel block service provider and wherein said unrestricted operating mode permits dialing to both said A-channel block service provider and said B-channel block service provider.

3. The system of claim 1 wherein said restricted operating mode permits home-area only dialing and wherein said unrestricted operating mode permits dialing outside a home area.

4. The system of claim 1 wherein said restricted operating mode permits dialing to only a first channel block service provider while in a home area and dialing to a second channel block service provider while outside said home area, and wherein said unrestricted operating mode permits dialing to both said A-channel block service provider and said B-channel block service provider in any area.

5. The system of claim 1 wherein said cellular transceiver comprises a memory of stored phone numbers, wherein said restricted operating mode permits dialing to only said stored phone numbers, and wherein said unrestricted operating mode permits dialing to any phone number.

6. The system of claim 5 wherein said restricted operating mode permits dialing to only a subset of said stored phone numbers.

7. The system of claim 1 wherein said restricted operating mode prohibits completion of calls while roaming and wherein said unrestricted operating mode permits calls while roaming.

* * * * *